United States Patent
Oba

(10) Patent No.: US 11,458,939 B2
(45) Date of Patent: Oct. 4, 2022

(54) TRAILER

(71) Applicant: HONDA MOTOR CO., LTD., Tokyo (JP)

(72) Inventor: Takeshi Oba, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 243 days.

(21) Appl. No.: 16/898,923

(22) Filed: Jun. 11, 2020

(65) Prior Publication Data

US 2020/0398803 A1 Dec. 24, 2020

(30) Foreign Application Priority Data

Jun. 18, 2019 (JP) .............................. JP2019-113011

(51) Int. Cl.
*B60T 8/17* (2006.01)
*B60T 8/1755* (2006.01)
(Continued)

(52) U.S. Cl.
CPC ........ *B60T 8/1708* (2013.01); *B60T 8/17551* (2013.01); *B60W 30/06* (2013.01);
(Continued)

(58) Field of Classification Search
CPC ............... B60T 8/1708; B60T 8/17551; B60T 2201/10; B60W 30/06; B60W 30/18036;
(Continued)

(56) References Cited

U.S. PATENT DOCUMENTS 10,363,961 B2  7/2019 Nordbruch
10,899,384 B2 * 1/2021 Zarco ..................... B62D 13/06
(Continued)

FOREIGN PATENT DOCUMENTS

DE  102014224099 A1  6/2016
DE  102015114308 A1  3/2017
(Continued)

OTHER PUBLICATIONS

Office Action dated Feb. 5, 2021, issued in counterpart DE Application No. 102020206828.3, with English translation. (27 pages).
(Continued)

*Primary Examiner* — Aniss Chad
*Assistant Examiner* — Madison R Hughes
(74) *Attorney, Agent, or Firm* — WHDA, LLP

(57) ABSTRACT

An electric self-traveling trailer capable of performing automatic following traveling to a towing vehicle without mechanical connection, includes a detection unit configured to detect a peripheral situation, a recognition unit configured to recognize a parking space based on a detection result of the detection unit, a setting unit configured to set a moving track used to move the trailer from a position at which the towing vehicle and the trailer have stopped to the parking space, and a moving control unit configured to move the trailer to the parking space along the moving track set by the setting unit. The setting unit sets the moving track that maintains a distance between the towing vehicle and the trailer within a predetermined range.

7 Claims, 12 Drawing Sheets

(51) Int. Cl.
*B60W 30/06* (2006.01)
*B60W 30/18* (2012.01)

(52) U.S. Cl.
CPC . *B60W 30/18036* (2013.01); *B60W 30/18109* (2013.01); *B60W 2300/14* (2013.01)

(58) Field of Classification Search
CPC ........ B60W 2300/14; B60W 30/18109; B62D 15/0285
See application file for complete search history.

(56) References Cited

U.S. PATENT DOCUMENTS

| | | |
|---|---|---|
| 2015/0115571 A1 | 4/2015 | Zhang et al. |
| 2019/0339716 A1 | 11/2019 | Kopischke |
| 2020/0346690 A1 * | 11/2020 | Maruoka ................ B62D 13/06 |
| 2020/0377094 A1 * | 12/2020 | Rabbiosi .................. B60L 7/18 |

FOREIGN PATENT DOCUMENTS

| | | |
|---|---|---|
| DE | 102017200168 A1 | 7/2018 |
| JP | 6-219348 A | 8/1994 |
| JP | 10-157652 A | 6/1998 |
| JP | 2000-113399 A | 4/2000 |
| JP | 2011-152831 A | 8/2011 |
| JP | 2018-34659 A | 3/2018 |
| WO | 2019/105665 A1 | 6/2019 |
| WO | WO-2020210808 A1 * | 10/2020 ............... B60D 1/62 |

OTHER PUBLICATIONS

Office Action dated Feb. 7, 2022, issued in counterpart JP Application No. 2019-113011, with Partial English Translation. (5 pages).

* cited by examiner

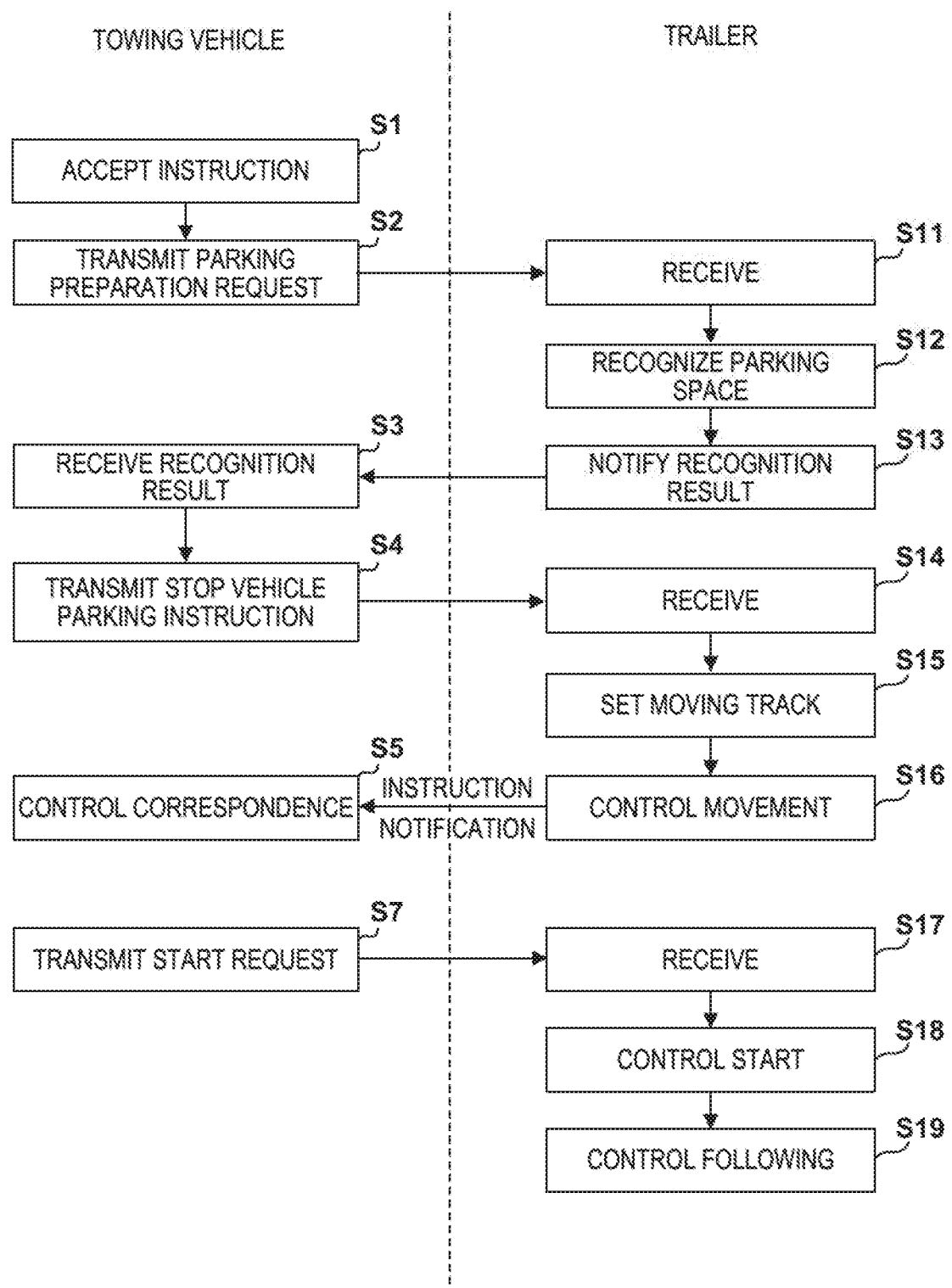

TRAILER

CROSS-REFERENCE TO RELATED APPLICATION(S)

This application claims priority to and the benefit of Japanese Patent Application No. 2019-113011 filed on Jun. 18, 2019, the entire disclosure of which is incorporated herein by reference.

BACKGROUND OF THE INVENTION

Field of the Invention

The present invention relates to a trailer.

Description of the Related Art

A camper trailer can ensure a wide comfortable living space and enhance installed equipment generally as compared to a recreational vehicle. In addition, both the initial cost and the running cost can be suppressed low. Furthermore, when the camper trailer is disconnected, the towing vehicle can be used for ordinary movement, and the trailer can be used as an outdoor living space. Such a trailer is highly convenient but needs experiences in maneuvering at the time of towing. There have been proposed techniques for improving the maneuverability at the time of towing (for example, Japanese Patent Laid-Open Nos. 2011-152831, 10-157652, and 6-219348). Additionally, along with the development of automation techniques for vehicles, following travel to a preceding vehicle and automatic parking have also been proposed (for example, Japanese Patent Laid-Open Nos. 2000-113399 and 2018-34659).

Since the total length of a towing vehicle and a trailer in a mechanical connection state is long, there is a limitation on parking lots where these can park on the way. If an automatic following technique or automatic parking technique is applied to the trailer, the trailer can automatically follow the towing vehicle without mechanical connection. This can improve the convenience in terms of maneuverability for the occupant of the towing vehicle and also allows the towing vehicle and the trailer to park in different parking spaces at a parking lot, thereby improving the convenience for the occupant of the towing vehicle from the viewpoint of parking.

However, when making the trailer automatically park alone, if the trailer is greatly separated from the towing vehicle, it is difficult for the occupant of the towing vehicle to monitor the movement of the trailer.

SUMMARY OF THE INVENTION

It is an object of the present invention to provide a technique of allowing the occupant of a towing vehicle to easily monitor automatic parking of a trailer.

According to an aspect of the present invention, there is provided an electric self-traveling trailer capable of performing automatic following traveling to a towing vehicle without mechanical connection, comprising: a detection unit configured to detect a peripheral situation; a recognition unit configured to recognize a parking space based on a detection result of the detection unit; a reception unit configured to receive a parking instruction; a setting unit configured to, if the reception unit has received the parking instruction, set a moving track used to move the trailer from a position at which the towing vehicle and the trailer have stopped to the parking space recognized by the recognition unit; and a moving control unit configured to move the trailer to the parking space along the moving track set by the setting unit, wherein the setting unit sets the moving track that maintains a distance between the towing vehicle and the trailer within a predetermined range.

Further features of the present invention will become apparent from the following description of exemplary embodiments (with reference to the attached drawings).

BRIEF DESCRIPTION OF THE DRAWINGS

FIG. 7 is a flowchart showing an example of processing of the control units of the trailer and the towing vehicle;

DESCRIPTION OF THE EMBODIMENTS

Figure 1:
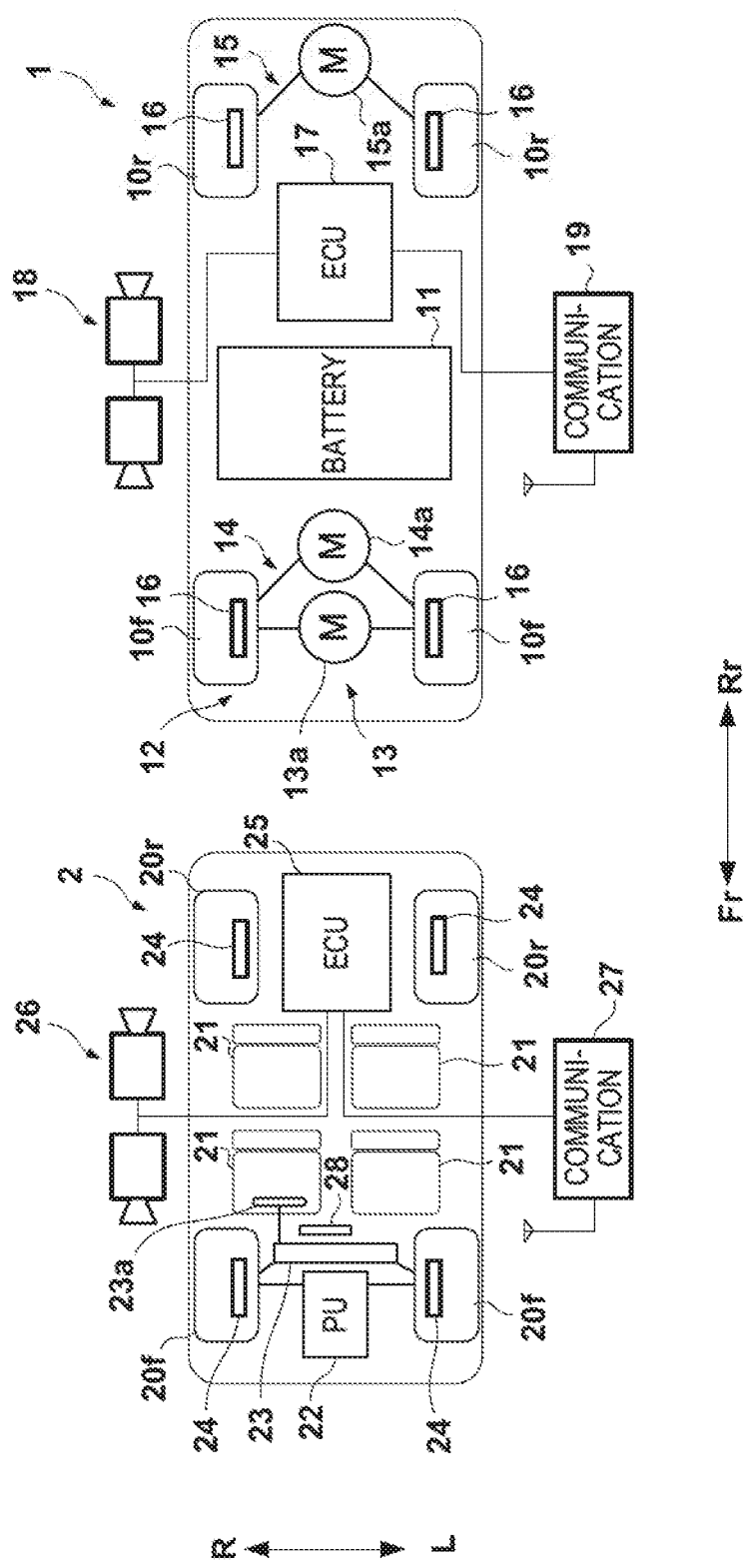
FIG. 1 is a block diagram of a trailer and a towing vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two of more of the multiple features described in the embodiments may be combined as appropriate. Furthermore, the same reference numerals are given to the same or similar configurations, and redundant description thereof is omitted.

Outline of Trailer and Towing Vehicle

FIG. 1 is a block diagram of a trailer 1 and a towing vehicle 2 according to an embodiment of the present invention. In FIG. 1, Fr, Pr, L, and R indicate front, rear, left, and right at the time of advance traveling of the trailer 1 and the towing vehicle 2. The trailer 1 is, for example, a camper trailer, and includes living spaces (not shown) such as a sofa, a bed, a shower, a bathroom, and a kitchen. On the other hand, the trailer is a vehicle including no driver's seat or a driving mechanism by an occupant, and is unmanned during traveling. The trailer 1 according to this embodiment is a four-wheeled vehicle including two front wheels 10f and two rear wheels 10r, but may be a three-wheeled vehicle.

The trailer 1 is an electric self-traveling vehicle including a battery 11 as a main power supply. The battery 11 is a secondary battery such as a lithium ion battery, and the trailer 1 self-travels by power supplied from the battery 11. The trailer 1 includes an electric traveling mechanism 12. The electric traveling mechanism 12 includes a traveling mechanism 13, steering mechanisms 14 and 15, and braking mechanisms 16.

The traveling mechanism 13 is a mechanism configured to make the trailer 1 advance or retreat using a traveling motor 13a as a driving source, and in this embodiment, uses the front wheels 10f as driving wheels. The front wheels 10f and the rear wheels 10r are each provided with the braking mechanism 16 such as a disc brake.

The steering mechanism 14 is a mechanism configured to give a steering angle to the front wheels 10f using a steering motor 14a as a driving source. The steering mechanism 15 is a mechanism configured to give a steeling angle to the rear wheels 10r using a steering motor 15a as a driving source. That is, the electric traveling mechanism 12 according to this embodiment includes a four-wheel steering mechanism that steers the front wheels 10f and the rear wheels 10r, but it may be a two-wheel steering mechanism that steers only the front wheels 10f or rear wheels 10r.

The trailer 1 includes a detection unit 18 configured to detect the peripheral situation. The detection unit 18 is an external sensor group configured to monitor the periphery of the trailer 1. The external sensors are, for example, cameras, radars, and LiDARs (Light Detection and Ranging). The external sensors can be provided on the front portion, the rear portion, and the left and right side portions of the trailer 1 whereby it is possible to monitor all the directions of the trailer 1. The trailer 1 also includes a communication device 19. The communication device 19 includes a communication unit configured to perform vehicle-to-vehicle communication with the towing vehicle 2.

The trailer 1 includes a control unit (ECU) 17. The control unit 17 includes a processor represented by a CPU, a storage device such as a semiconductor memory or a hard disk, and an interface to an external device. The storage device stores programs to be executed by the processor, and data (map information) to be used by the processor to perform processing. A plurality of sets of a processor, a storage device, and an interface may be provided for each function of the trailer 1 and configured to be communicable with each other. The control unit 17 performs automatic following traveling control to the towing vehicle 2 or parking control of the trailer 1 to be described later based on the detection result of the detection unit 18 or information acquired by communication of the communication device 19 with the towing vehicle 2.

The towing vehicle 2 is a four-wheeled vehicle including two front wheels 20f and two rear wheels 20r, and is, for example, a passenger vehicle having an automated driving function. The towing vehicle 2 includes four seats 21 on front and rear lines. The number of seats is not limited to this, and, for example, three seats may be provided on the rear line. The right seat 21 on the front line is a driver's seat at which a steering wheel 23a is arranged. An input/output device 28 configured to display information to the occupant is arranged near the driver's seat. The input/output device 28 according to this embodiment is a touch panel type display device, which not only displays information to the occupant but also serves as an input device used by the occupant to input an instruction to the towing vehicle 2. The input/output device 28 may be a voice input/output device, or may be a device serving as both a touch panel type display device and a voice input/output device.

The towing vehicle 2 includes a power unit (PU) 22 configured to make the towing vehicle 2 advance or retreat. The power unit 22 includes, for example, an engine and an automatic transmission, and drives the front wheels 20f. The power unit 22 can accelerate/decelerate the towing vehicle 2 by an operation of the driver on an accelerator pedal (not shown), and can also automatically accelerate/decelerate the towing vehicle 2 under the control of a control unit (ECU) 25. The front wheels 20f and the rear wheels 20r are each provided with a braking mechanism 24 such as a disc brake. The braking mechanism 24 can brake the towing vehicle 2 by an operation of the driver on a brake pedal (not shown), and can also automatically brake the towing vehicle 2 under the control of the control unit (ECU) 25.

The towing vehicle 2 includes an electric power steering mechanism 23. The electric power steering mechanism 23 gives a steering angle to the front wheels 20f by an operation of the driver on the steering wheel 23a. In addition, the electric power steering mechanism 23 has an automatic steering function using a motor as a driving source, and can give a steering angle to the front wheels 20f without depending on the operation of the driver.

The towing vehicle 2 includes a detection unit 26 configured to detect the peripheral situation. The detection unit 26 is an external sensor group configured to monitor the periphery of the towing vehicle 2. The external sensors are, for example, cameras, radars, and LiDARs (Light Detection and Ranging). The external sensors can be provided on the front portion, the rear portion, and the left and right side portions of the towing vehicle 2 whereby it is possible to monitor the all directions of the towing vehicle 2. The towing vehicle 2 also includes a communication device 27. The communication device 27 includes a communication unit configured to perform vehicle-to-vehicle communication with the trailer 1, and a communication unit configured to communicate with a server that provides various kinds of information via a communication network such as the Internet.

The towing vehicle 2 includes the control unit 25. The control unit 25 includes a processor represented by a CPU, a storage device such as a semiconductor memory or a hard disk, and an interface to an external device. The storage device stores programs to be executed by the processor, and data to be used by the processor to perform processing. A plurality of sets of a processor, a storage device, and an interface may be provided for each function of the towing vehicle 2 and configured to be communicable with each other.

The control unit 25 can perform automated driving or traveling support of the towing vehicle 2 based on the detection result of the detection unit 26 or information or map information acquired by the communication device 27. In addition, the control unit 25 can issue various kinds of instructions to the trailer 1 via the communication device 27.

Automatic Following Control

The trailer 1 can perform automatic following traveling to the towing vehicle 2 without connection. For example, the control unit 17 of the trailer 1 identifies the leaning towing vehicle 2 based on the detection result of the detection unit 18, and follows the towing vehicle 2 while maintaining a predetermined distance from the towing vehicle 2. To facilitate identification of the towing vehicle 2, an identification mark may be provided on the rear portion of the towing vehicle 2, and the detection unit 18 may include a camera configured to capture and recognize the identification mark. In addition, the control unit 17 and the control unit 25 may collate each other's ID information by vehicle-to-vehicle communication and mutually recognize whether the vehicles should be set in a towing relationship.

The control unit 25 of the towing vehicle 2 transmits the information of the guidance route of the towing vehicle 2 and acceleration/deceleration, braking, and right/left turn of the towing vehicle 2 to the trailer 1 by vehicle-to-vehicle communication. The control unit 17 of the trailer 1 recognizes a traveling lane based on the received information or by detecting a lane division line, a curbstone, and the like by the detection unit 18, and follows the towing vehicle 2 while maintaining the traveling lane by referring to map information. The control unit 25 may instruct a recommended inter-vehicle distance to the control unit 17, and the control unit 17 may control the traveling of the trailer 1 so as to maintain the recommended inter-vehicle distance.

Automatic Parking Control

The trailer 1 according to this embodiment is not mechanically connected to the towing vehicle 2, and can therefore park in a parking space different from that of the towing vehicle 2. This can increase choices of parking lots on the way and improve the convenience for the occupant of the towing vehicle 2 from the viewpoint of parking. An example of automatic parking control of the trailer 1 will be described with reference to FIGS. 2 to 7. FIGS. 2 to 6 are views schematically showing the behaviors of the trailer 1 and the towing vehicle 2 in the automatic parking control. FIG. 7 is a flowchart showing an example of processing of the control unit 17 of the trailer 1 and the control unit 25 of the towing vehicle 2. The drawings will appropriately be referred to.

Figure 2:
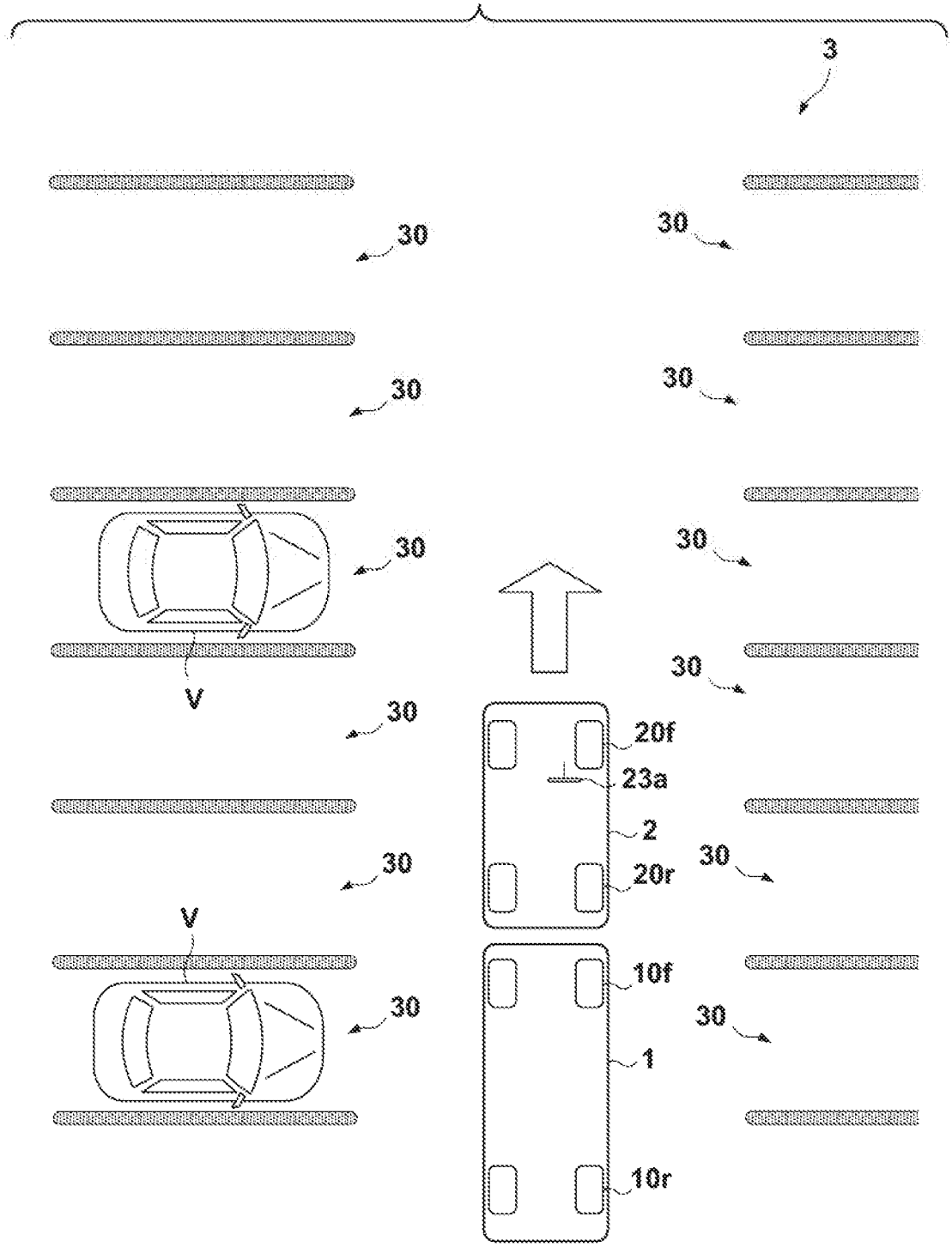
FIG. 2 is an explanatory view of automatic parking control of the trailer.

FIG. 2 shows a stage in which the towing vehicle 2 is entering a parking lot 3. The trailer 1 is executing automatic following control to the towing vehicle 2. A plurality of parking spaces 30 exist in the parking lot 3. When the occupant of the towing vehicle 2 instructs to make preparation for parking of the trailer 1 via the input/output device 28, the control unit 25 of the towing vehicle 2 accepts this (step S1 of FIG. 7), and transmits a parking preparation request to the control unit 17 of the trailer 1 by vehicle-to-vehicle communication (step S2 of FIG. 7).

Figure 3:
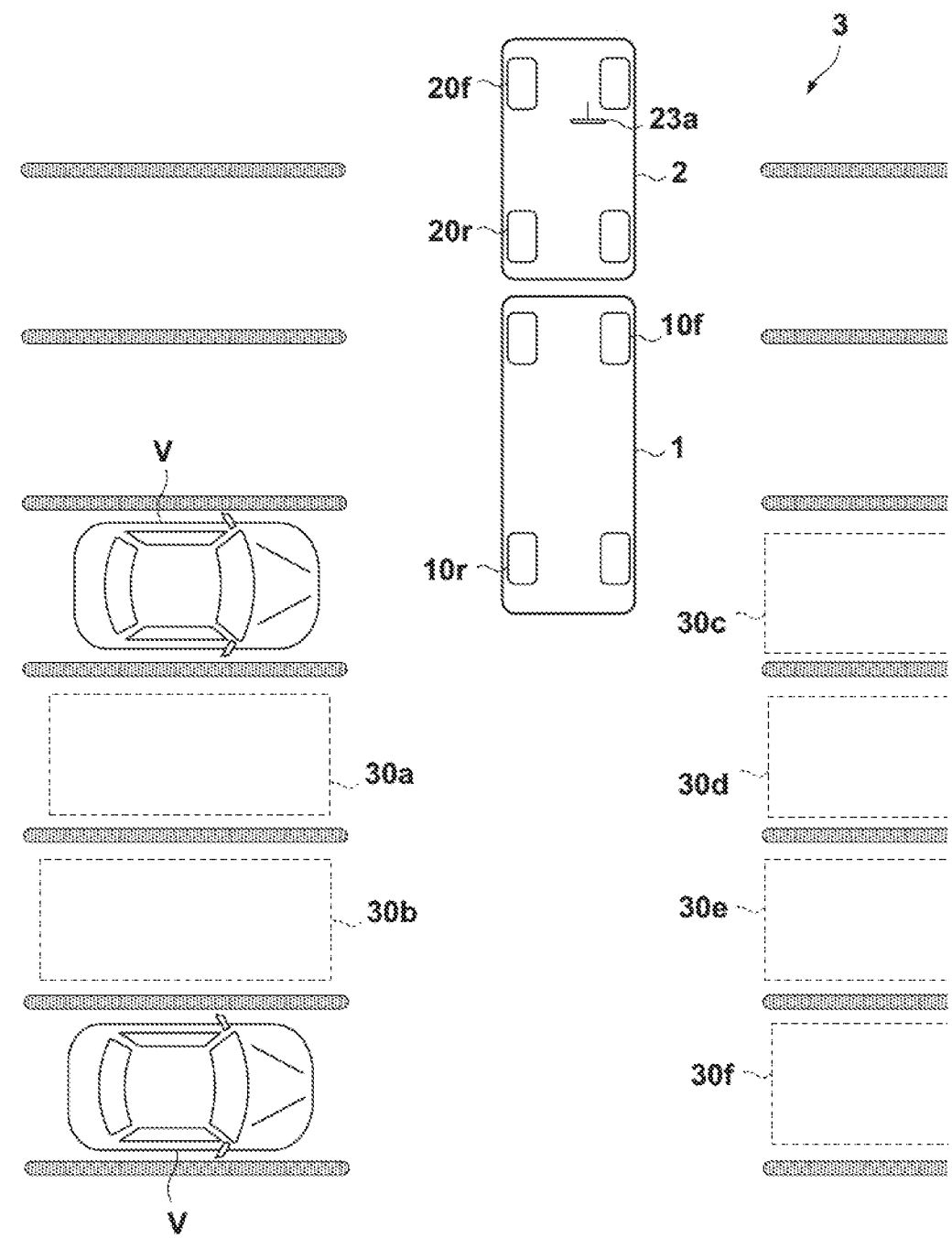
FIG. 3 is an explanatory view of automatic parking control of the trailer.

The control unit 17 of the trailer 1 receives the parking preparation request (step S11 of FIG. 7), and recognizes free parking spaces 30 based on the detection result of the detection unit 18 (step S12 of FIG. 7). FIG. 3 shows a situation in which parking spaces 30a to 30f are recognized as parking candidates for the trailer 1. The control unit 17 transmits a notification representing that parking is possible in the parking spaces 30a to 30f in FIG. 3 as the recognition result of parking spaces to the control unit 25 of the towing vehicle 2 by vehicle-to-vehicle communication (step S13 of FIG. 7).

The control unit 25 of the towing vehicle 2 receives the notification (step S3 of FIG. 7). If the towing vehicle 2 is not stopped, the control unit 25 stops the towing vehicle 2 (step S4 of FIG. 7), and the trailer 1 is also stopped. As for the stop of the towing vehicle 2, for example, the input/output device 28 urges the occupant to stop, and the occupant performs a stop operation, thereby stopping the towing vehicle 2. After the stop of the towing vehicle 2 and the trailer 1, the control unit 25 displays figures or videos representing the parking spaces 30a to 30f on the input/output device 28, and causes the occupant of the towing vehicle 2 to select a parking space to park the trailer 1. If parking space selection and parking start are instructed on the input/output device 28 by the occupant, the control unit 25 of the towing vehicle 2 transmits a parking instruction of the trailer 1 for the selected parking space to the control unit 17 of the trailer 1 by vehicle-to-vehicle communication (step S4 of FIG. 7).

Figure 4:
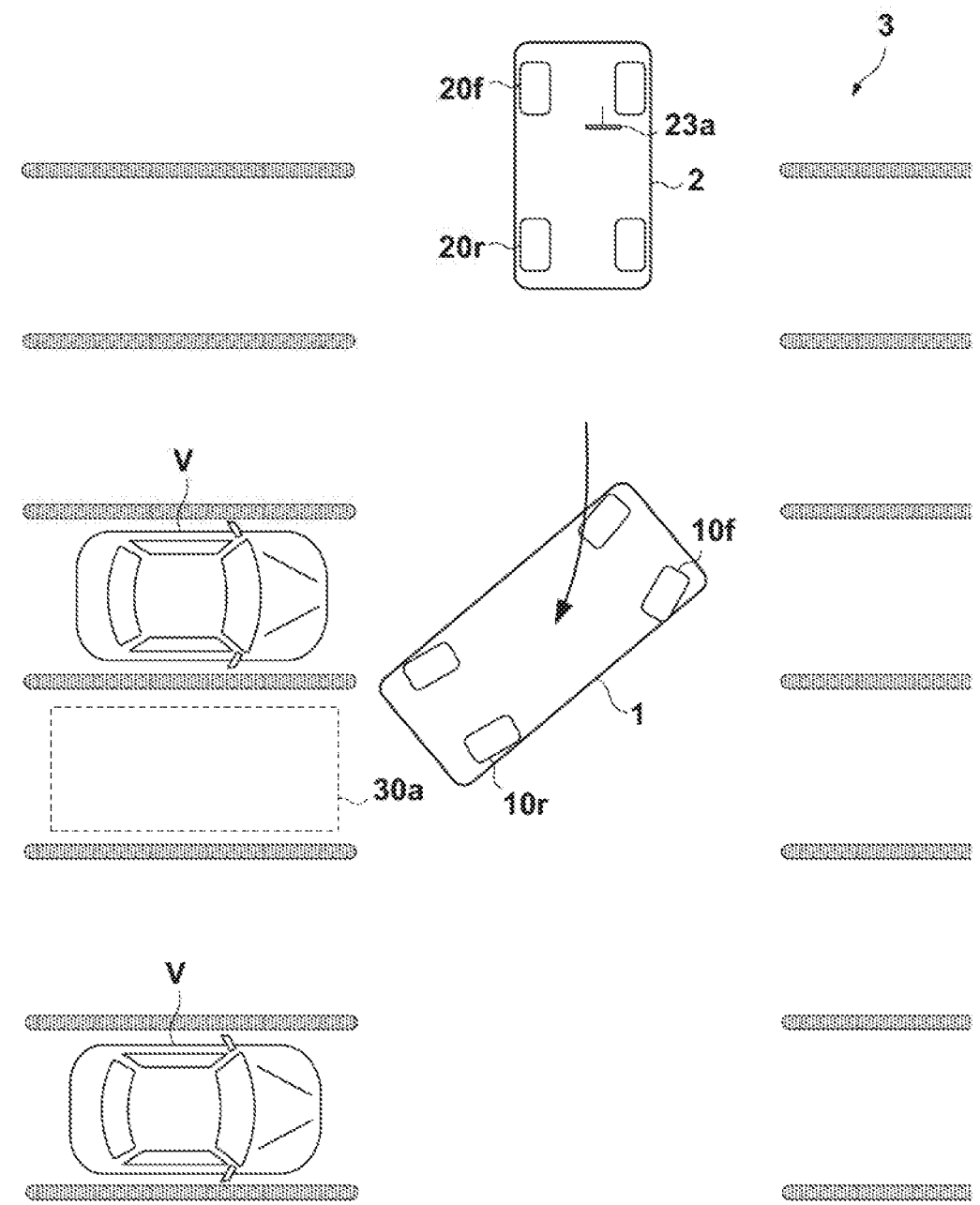
FIG. 4 is an explanatory view of automatic parking control of the trailer.
Figure 5:
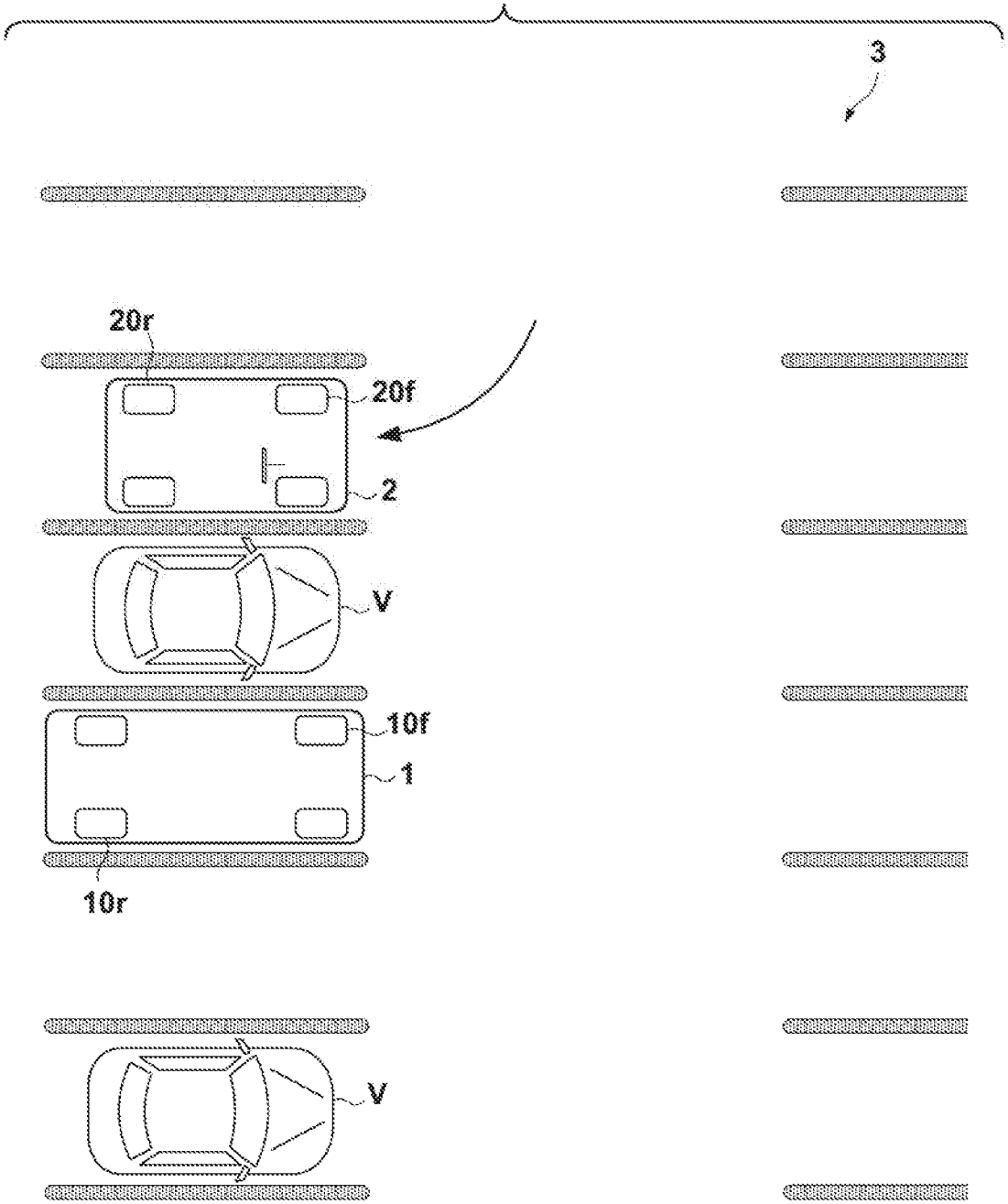
FIG. 5 is an explanatory view of automatic parking control of the trailer.

The control unit 17 of the trailer 1 receives the parking instruction (step S14 of FIG. 7), ends automatic following to the towing vehicle 2, and starts automatic parking. In the automatic parking control, the control unit 17 first recognizes the peripheral situation (the existence of other parking vehicles V, structures on the periphery, the position of the parking space 30a, and the like) based on the detection result of the detection unit 18, and calculates and sets a moving track from the stop position to the parking space 30a (step S15 of FIG. 7). Then, the control unit 17 controls driving of the electric traveling mechanism 12 such that the trailer 1 moves along the set moving track (step S15 of FIG. 7). The example shown in FIG. 4 shows a state in which the trailer 1 is being moved to the instructed parking space 30a.

During the movement of the trailer 1, the control unit 25 of the towing vehicle 2 performs corresponding control (step S5 of FIG. 7). Details will be described later. During the movement of the trailer 1 to the parking space 30a, the occupant of the towing vehicle 2 can monitor the behavior of the trailer 1.

When parking of the trailer 1 is completed, the driver of the towing vehicle 2 parks the towing vehicle 2 in a parking space he/she likes. As in an example of FIG. 5, the trailer 1 and the towing vehicle 2 can be parked in separate parking spaces.

Figure 6A:
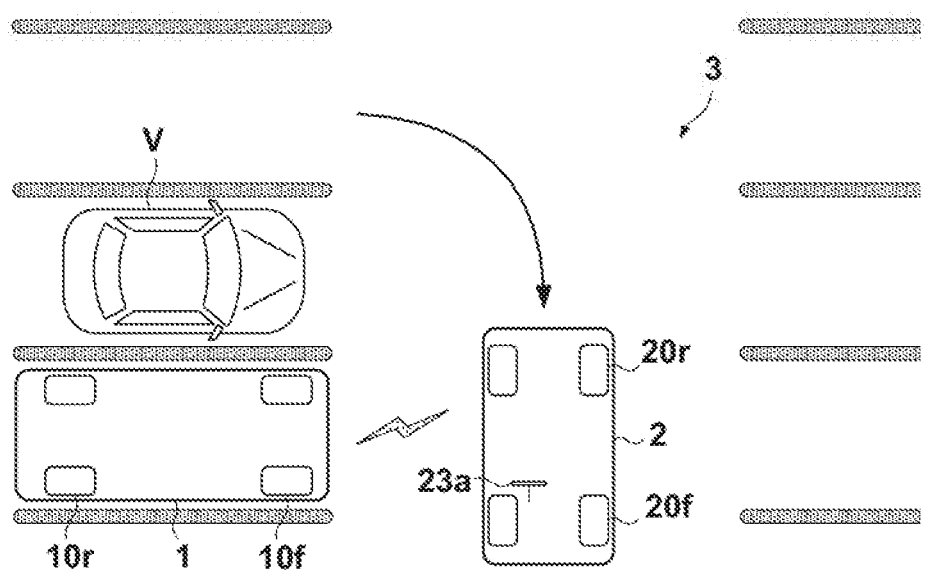
FIGS. 6A and 6B are explanatory views of start control of the trailer from a parking space.
Figure 6B:
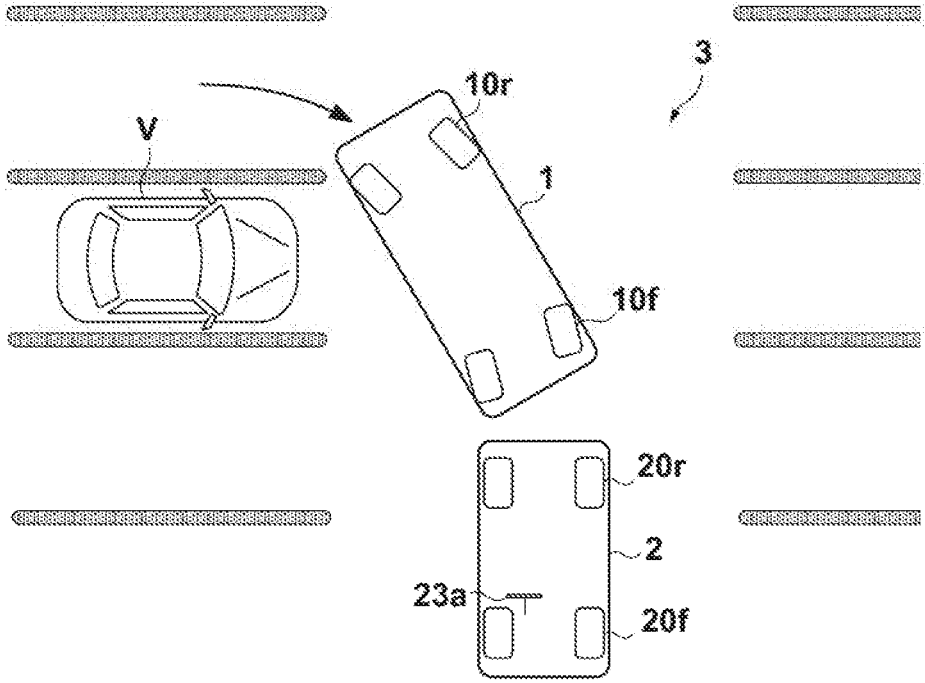

FIG. 6A shows a case in which the towing vehicle 2 departs from the parking lot 3. The control unit 25 of the towing vehicle 2 transmits a start request to the control unit 17 of the trailer 1 by vehicle-to-vehicle communication (step S7 of FIG. 7). The control unit 17 of the trailer 1, which has received the start request (step S17 of FIG. 7), starts start control (step S18 of FIG. 7). In the start control, the control unit 17 recognizes the existence of the towing vehicle 2 based on the detection result of the detection unit 18, and moves the trailer 1 to a position behind the towing vehicle 2, as shown in FIG. 6B. Next, automatic following traveling to the towing vehicle 2 is started (step S19 of FIG. 7). Since it is easy to return to the automatic following traveling after parking, the convenience of the trailer 1 improves for the occupant of the towing vehicle 2.

Moving Track Setting and Moving Control

Moving track setting in step S15 of FIG. 7, moving control in step S16, and corresponding control in step S5 will be described. At the time of automatic parking of the trailer 1, if the trailer 1 separates far from the towing vehicle 2, it is difficult for the occupant of the towing vehicle 2 to monitor the behavior of the trailer 1. Hence, automatic parking of the trailer 1 is performed while maintaining the existence of the towing vehicle 2 near the trailer 1.

Figure 8B:
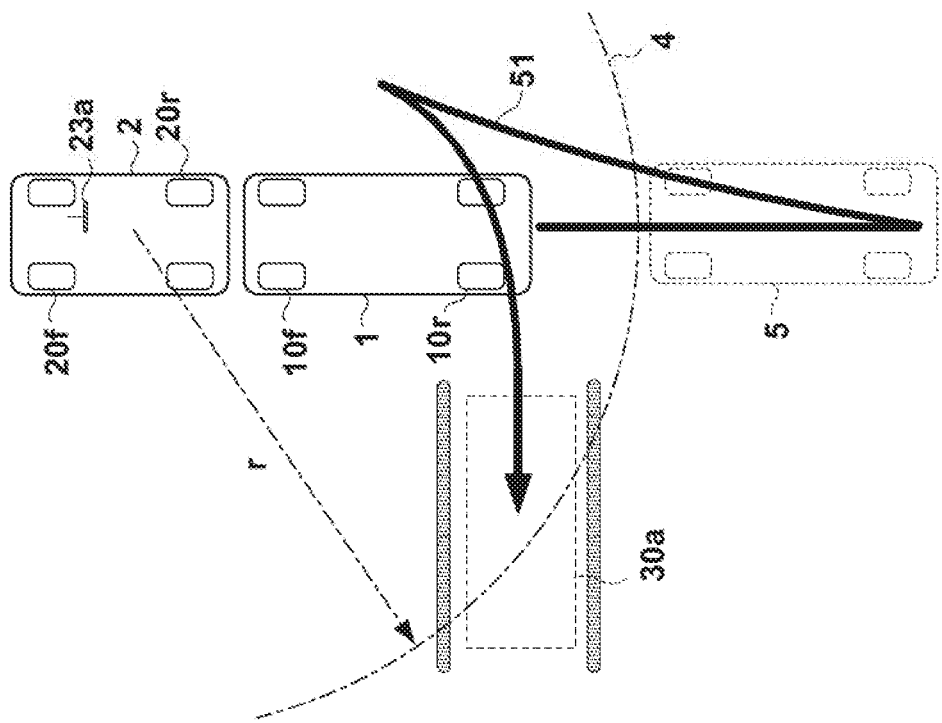
FIGS. 8A and 8B are explanatory views of a moving track setting method.
Figure 8A:
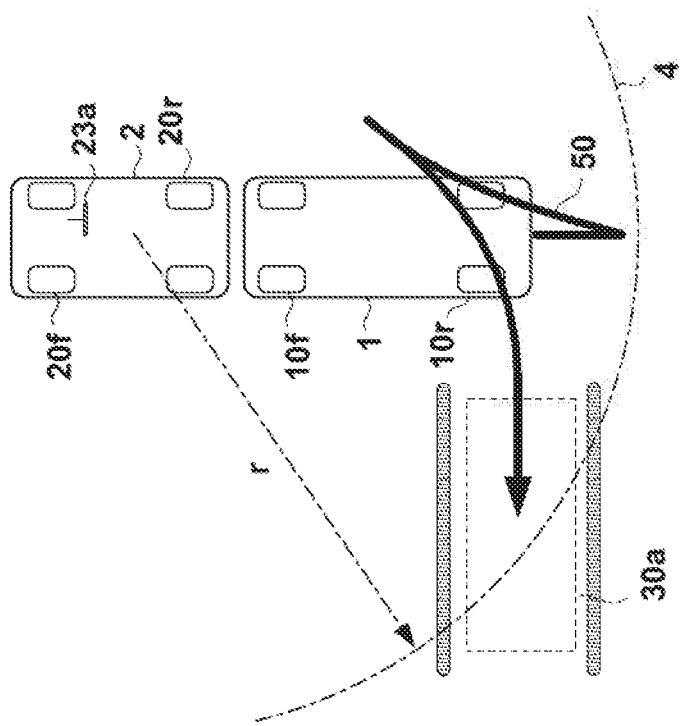

FIG. 8A is an explanatory view showing a setting example of a moving track in step S15. The control unit 17 sets plane coordinates in the parking lot 3 based on the detection result of the detection unit 18, and specifies the positions of the trailer 1, the towing vehicle 2, the parking spaces 30, and obstacles on the plane coordinates. The control unit 17 calculates one or a plurality of candidates of moving tracks used to, for example, move the trailer 1 from the stop position of the trailer 1 to the parking space 30a. Then, the control unit 17 selects a moving track that maintains the trailer 1 within a range 4 of a distance r from the towing vehicle 2. This allows the occupant of the towing vehicle 2 to easily monitor the behavior of the trailer 1. Allowing track 50 shown in FIG. 8A is a track that makes the trailer 1 retreat straight, then advance, and then retreat to the rear left side, thereby moving the trailer 1 to the parking space 30a.

In the example shown in FIG. 8A, the center of the range 4 is the center position of the towing vehicle 2. As the center position of the towing vehicle 2, for example, a position at the center in the vehicle width direction of the trailer 1 and apart by 2 m to the side of the towing vehicle 2 may be regarded as the center position of the towing vehicle 2. Alternatively, the center of the range 4 may be the rear end portion of the towing vehicle 2. The distance r that is the radius of the range 4 is a distance within the range of, for example, 6 m to 10 m.

The moving track that maintains the trailer 1 within the range 4 of the distance r from the towing vehicle 2 may be a track that maintains the entire trailer 1 within the range 4. In this embodiment, however, it is a track that maintains a part of the trailer 1 within the range 4. A moving track 51 shown in FIG. 8B is an example of a moving track that does not maintain the trailer 1 within the range 4. The moving track 51 is a track that makes the trailer 1 retreat straight, then advance to the front right side, and then retreat to the rear left side, thereby moving the trailer 1 to the parking space 30a. When the trailer 1 is made to retreat straight, the entire trailer 1 is located outside the range 4. Hence, the moving track 51 is not set basically.

Figure 9B:
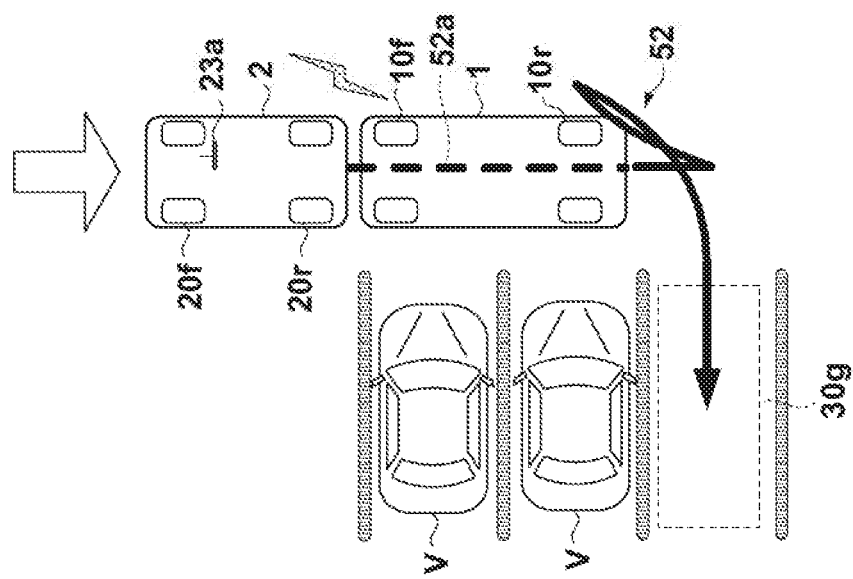
FIGS. 9A and 9B are explanatory views of an example in which the trailer and the towing vehicle move together.
Figure 9A:
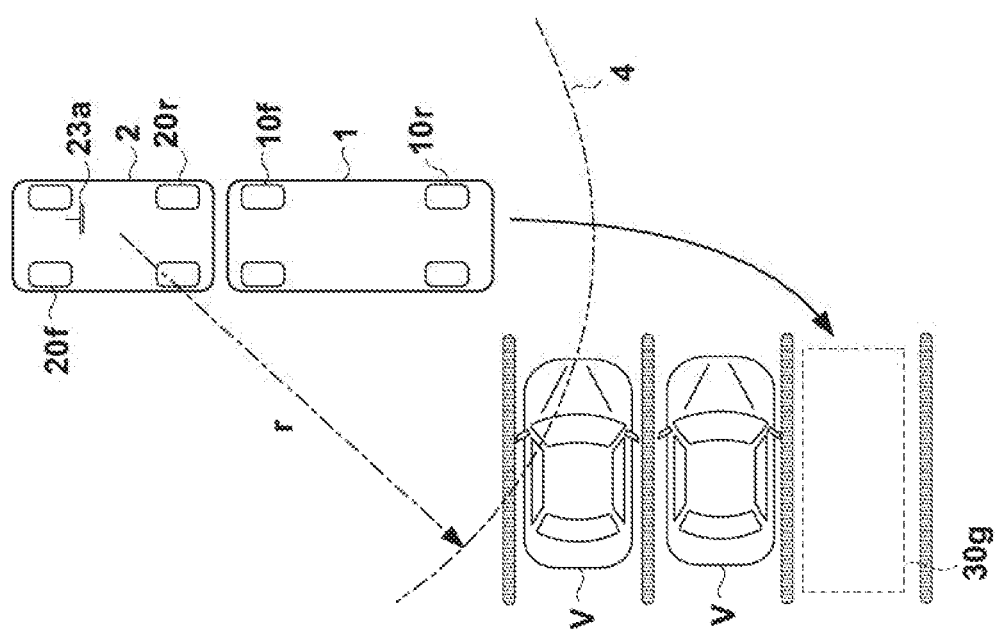

If the moving track that maintains the trailer 1 within the range 4 cannot be set, the control unit 17 sets a moving track including a section where the trailer 1 and the towing vehicle 2 move together. By making the trailer 1 follow the towing vehicle 2, the existence of the towing vehicle 2 near the trailer 1 is maintained. FIGS. 9A and 9B are explanatory views.

In the example shown in FIG. 9A, it is assumed that the occupant of the towing vehicle 2 selects the parking space 30g as the parking space for the trailer 1. The parking space 30g is apart from the stop position of the towing vehicle 2 by the distance r or more, and there does not exist a moving track that maintains the trailer 1 within the range 4. In this case, the control unit 17 sets a moving track 52 shown in FIG. 9B. Note that this also applies to a case in which a moving track that maintains the trailer 1 within the range 4 does not exist because of the existence of a peripheral obstacle.

The moving track 52 includes a section 52a where the trailer 1 and the towing vehicle 2 move together. The control unit 17 of the trailer 1 transmits an instruction to move (retreat in the example of FIG. 9B) only in the section 52a together with the trailer 1 to the control unit 25 of the towing vehicle 2 by vehicle-to-vehicle communication. The control unit 25 of the towing vehicle 2, which has received the instruction, moves the towing vehicle 2 in cooperation with the trailer 1 only in the section 52a. The movement of the towing vehicle 2 may be done by automated driving by the control unit 25, or the driver of the towing vehicle 2 may be urged by the input/output device 28 to move. When urging the driver to move, for the stop of the towing vehicle 2, the control unit 25 may support braking by the braking device 24.

When the trailer 1 and the towing vehicle 2 move only in the section 52a, the towing vehicle 2 stops, and only the trailer 1 moves to the parking space 30g. In this movement, the trailer 1 can be maintained within the range 4. In the example shown in FIG. 9B, after the movement in the section 52a, the trailer 1 is caused to retreat straight, then advance to the front right side, and then retreat to the rear left side, thereby moving the trailer 1 to the parking space 30g.

As described above, if the moving track that maintains the trailer 1 within the range 4 cannot be set by the stop positions of the trailer 1 and the towing vehicle 2 when moving the trailer 1 to the parking space 30, the towing vehicle 2 is moved together in a predetermined section, thereby setting the moving track that maintains the trailer 1 within the range 4.

Figure 10A:
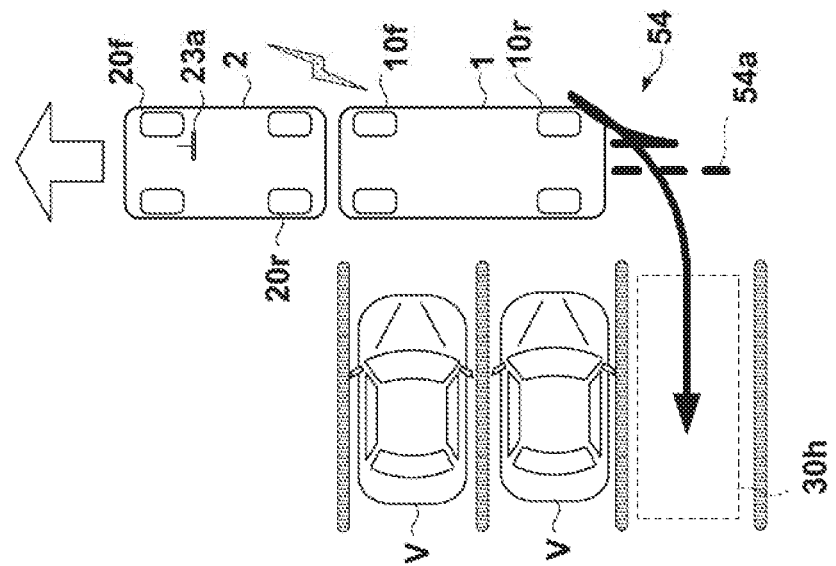
FIGS. 10A and 10B are explanatory views of an example in which the trailer and the towing vehicle move together.
Figure 10B:
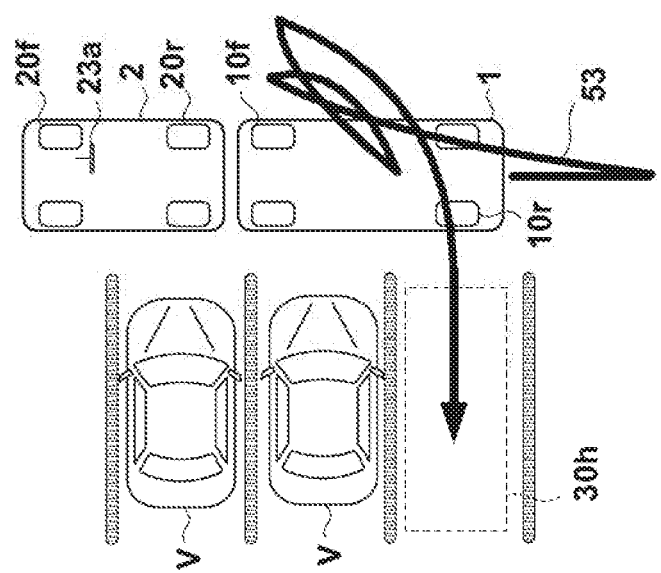

Another example of a case in which the control unit 17 sets a moving track including a section where the trailer 1 and the towing vehicle 2 move together will be described next. When moving the trailer 1 to the parking space 30, a necessity to turn the trailer 1 many times may occur depending on the existence of an obstacle on the periphery. In this case, the occupant of the towing vehicle 2 may feel anxious about whether the trailer 1 can be moved to the parking space 30. If the moving distance of the trailer 1 to the parking space 30 is a predetermined distance or more, a moving track including a section where the trailer 1 and the towing vehicle 2 move together is set. The predetermined distance is a distance within the range of, for example, 15 m to 20 m. FIGS. 10A and 10B are explanatory views.

FIG. 10A shows a situation in which a moving track 53 is calculated as a moving track selection candidate for the trailer 1 to a parking space 30h. The moving track 53 is a moving track that maintains the trailer 1 within the range 4 described with reference to FIG. 8A and the like. However, the moving track 53 includes many turns of the trailer 1, and causes the trailer 1 to retreat straight, then advance to the front right side, then retreat to the rear left side, advance from that position, and then retreat to the rear left side. As a result, the moving track 53 is a track whose distance from the start of the movement to the end of the movement is long. In this case, the control unit 17 sets a moving track 54 shown in FIG. 10B.

The moving track 54 includes a section 54a where the trailer 1 and the towing vehicle 2 move together. The control unit 17 of the trailer 1 transmits an instruction to move (advance in the example of FIG. 10B) only in the section 54a together with the trailer 1 to the control unit 25 of the towing vehicle 2 by vehicle-to-vehicle communication. The control unit 25 of the towing vehicle 2, which has received the instruction, moves the towing vehicle 2 in cooperation with the trailer 1 the section 54a. The movement of the towing vehicle 2 may be done by automated driving by the control unit 25, or the drive of the towing vehicle 2 may be urged by the input/output device 28 to move. When urging the driver to move, for the stop of the towing vehicle 2, the control unit 25 may support braking by the braking device 24.

When the trailer 1 and the towing vehicle 2 move only in the section 54a, the towing vehicle 2 stops, and only the trailer 1 moves to the parking space 30h. In this movement, the trailer 1 can be maintained within the range 4. In the example shown in FIG. 10B, after the movement in the section 54a, the trailer 1 is caused to retreat straight, then advance to the front right side, and then retreat to the rear left side, thereby moving the trailer 1 to the parking space 30h.

Note that FIGS. 10A and 10B show an example in which if the moving distance of the trailer 1 to the parking space 30 is a predetermined distance or more, a moving track including a section where the trailer 1 and the towing vehicle 2 move together is set. The moving track including the section where the trailer 1 and the towing vehicle 2 move together may be set not based on the distance but based on the number of turns of the trailer 1 (for example, five or more).

Figure 11:
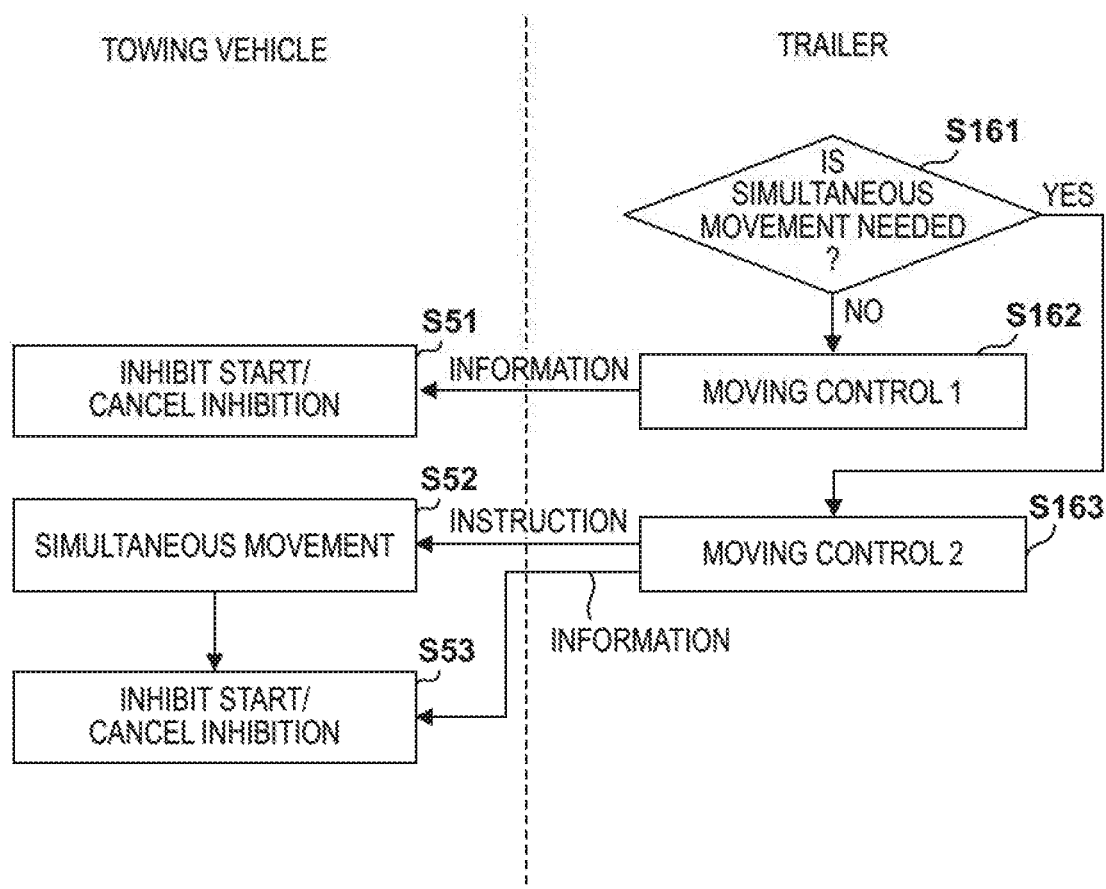
FIG. 11 is a flowchart showing an example of moving control and corresponding control in FIG. 7.

A processing example of moving control in step S16 of FIG. 7 and corresponding control in step S5 will be described next with reference to FIG. 11. Steps S161 to S163 of FIG. 11 show an example of moving control in step S16 of FIG. 7, and steps S51 to S53 show an example of corresponding control in step S5 of FIG. 7.

When the moving track is set in step S15 of FIG. 7, in step S161, the control unit 17 of the trailer 1 determines whether the set moving track includes a section (the section 52*a* in FIG. 9B or the section 54*a* in FIG. 10B) where the trailer 1 and the towing vehicle 2 are moved simultaneously. If the section is not included, the process advances to step S162. If the section is included, the process advances to step S163.

In step S162, the control unit 17 of the trailer 1 executes moving control 1. In moving control 1, the control unit 17 moves the trailer 1 along the moving track set in step S15 without needing the movement of the towing vehicle 2 as shown in FIG. 8A. If the towing vehicle 2 moves during the movement of the trailer 1, the towing vehicle 2 may separate from the trailer 1. Hence, the control unit 17 of the trailer 1 transmits, to the control unit 25 of the towing vehicle 2, in-motion information representing that the trailer 1 is moving to the parking space 30. The in-motion information may be transmitted periodically during the movement of the trailer 1, or may be transmitted at the start of the movement of the trailer 1 and at the end of the movement. The control unit 25 of the towing vehicle 2, which has received the in-motion information, inhibits the start of the towing vehicle 2 that is stopping, and cancels the start inhibition when the movement of the trailer 1 has ended. The start inhibition may be done by the control unit 25 of the towing vehicle 2 by stopping the power unit 22 or cutting driving transmission to the front wheels 20*f* that are driving wheels (setting the transmission to neutral). Alternatively, although the towing vehicle 2 can start, the occupant may be warned by the input/output device 28 not to start the towing vehicle 2. If the towing vehicle 2 has started, the trailer 1 may be stopped.

In step S163, the control unit 17 of the trailer 1 executes moving control 2. In moving control 1, the control unit 17 moves the towing vehicle 2 together with the trailer 1, as shown in FIG. 9B or 10B. Hence, the control unit 17 of the trailer 1 transmits a moving instruction to the control unit 25 of the towing vehicle 2. The control unit 25 of the towing vehicle 2, which has received the moving instruction, moves together with the trailer 1 in step S52.

When the moving section of the trailer 1 and the towing vehicle 2 ends, the towing vehicle 2 stops. The control unit 17 of the trailer 1 starts control of moving the trailer 1 alone to the parking space 30. At this time, in-motion information representing that the trailer 1 is moving to the parking space 30 is transmitted to the control unit 25 of the towing vehicle 2, as in moving control 1 of step S162. The control unit 25 of the towing vehicle 2, which has received the in-motion information, inhibits the start of the towing vehicle 2 that is stopping in step S53, and cancels the start inhibition when the movement of the trailer 1 has ended. The moving control in step S16 of FIG. 7 and the corresponding control in step S5 thus end.

Parking Instruction Using Communication Terminal

Figure 12A:
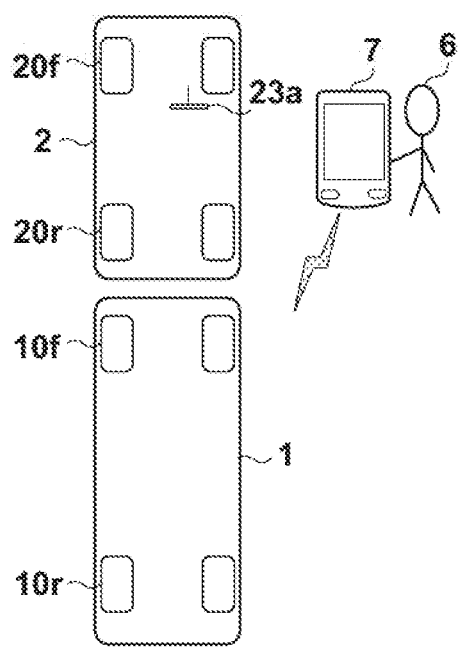
FIG. 12A is a view showing an example of an instruction by the communication terminal of an occupant.

In the above-described embodiment, when the occupant of the towing vehicle 2 instructs parking of the trailer 1, the instruction is transmitted to the control unit 17 of the trailer 1 via the in-vehicle devices (the input/output device 28 and the control unit 25) of the towing vehicle 2 (steps S1 to S4 of FIG. 7). In addition, the instruction may be transmitted to the control unit 17 of the trailer 1 from the communication terminal of the occupant. FIG. 12A is a schematic view.

In the example shown in FIG. 12A, an occupant 6 of the towing vehicle 2 exits from the towing vehicle 2, and transmits an instruction to the control unit 17 of the trailer 1 by wireless communication using a communication terminal 7 of his/her own. Since the occupant 6 can transmit the parking instruction to the trailer 1 while exiting from the towing vehicle 2, the occupant 6 can move to a place to easily monitor the movement of the trailer 1.

Figure 12B:
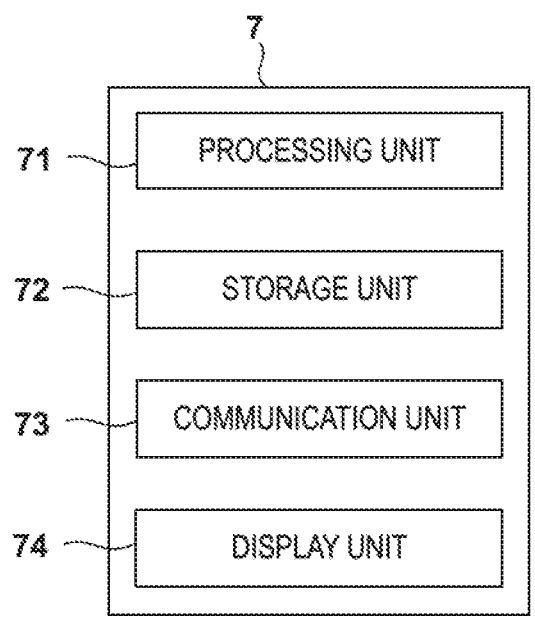
FIG. 12B is a block diagram of the communication terminal.

The communication terminal 7 is a portable terminal represented by, for example, a smartphone. FIG. 12B is a block diagram of the communication terminal 7. The communication terminal 7 includes a processing unit 71, a storage unit 72, a communication unit 73, and a display unit 74. The processing unit 71 is a processor represented by a CPU, and executes programs stored in the storage unit 72. The storage unit 72 is a storage device such as a RAM or a ROM. The programs stored in the storage unit 72 include an application program configured to send a parking instruction to the control unit 17 of the trailer 1. The communication unit 73 is a wireless communication device capable of communicating with the communication device 19 of the trailer 1. The display unit 74 is an electronic image display device having an input function, and is, for example, a touch panel display.

As the processing to be executed by the communication terminal 7, for example, the processes of steps S1 to S4 of FIG. 7 can be executed. The remaining processes can be performed by the control unit 25 of the towing vehicle 2 by vehicle-to-vehicle communication with the control unit 17 of the trailer 1.

Summary of Embodiment

The above embodiment discloses at least the following trailer.

1. According to the above embodiment, there is provided an electric self-traveling trailer (1) capable of performing automatic following traveling to a towing vehicle (2) without mechanical connection, comprising:

a detection unit (18) configured to detect a peripheral situation;

a recognition unit (17, S12) configured to recognize a parking space based on a detection result of the detection unit;

a reception unit (19, 17, S11) configured to receive a parking instruction;

a setting unit (17, S15) configured to, if the reception unit has received the parking instruction, set a moving track used to move the trailer from a position at which the towing vehicle and the trailer have stopped to the parking space recognized by the recognition unit;

a moving control unit (17, S16) configured to move the trailer to the parking space along the moving track set by the setting unit, wherein the setting unit sets the moving track (50) that maintains a distance between the towing vehicle and the trailer within a predetermined range (4).

According to this embodiment, it is possible to provide a technique of allowing the occupant of the towing vehicle to easily monitor automatic parking of the trailer.

2. In the above embodiment, if the moving track that maintains the distance between the towing vehicle and the trailer within the predetermined range cannot be set, the setting unit sets a moving track (52) including a section (52*a*) here the trailer and the towing vehicle move together.

According to this embodiment, even if the moving track cannot be set because of the stop positions of the towing vehicle and the trailer, the moving track can be set by moving the towing vehicle, and the occupant of the towing vehicle can easily monitor automatic parking of the trailer.

3. In the above embodiment, if a moving distance to the parking space is not less than a predetermined distance, the setting unit sets a moving track (54) including a section (54*a*) where the trailer and the towing vehicle move together.

According to this embodiment, if the moving distance to move the trailer to the parking space is long, and the occupant of the towing vehicle may feel anxious, the distance to move the trailer alone can be made short by moving the towing vehicle, and the anxiety of the occupant of the towing vehicle can be eliminated.

4. The trailer according to the above embodiment further comprises a transmission unit (19, 17, S163) configured to transmit, to a control unit (25) of the towing vehicle, a request to move together with the trailer if the setting unit has set the moving track including the section where the trailer and the towing vehicle move together.

According to this embodiment, the control unit of the towing vehicle can easily recognize the necessity of movement to park the trailer.

5. The trailer according to the above embodiment further comprises a transmission unit (19, 17, S162, S163) configured to transmit, to a control unit of the towing vehicle, information representing that the trailer is moving to the parking space.

According to this embodiment, the control unit of the towing vehicle can easily recognize that the trailer is moving for parking, and it is possible to easily maintain a state such as maintaining of the stop of the towing vehicle in which the occupant can easily monitor the trailer.

6. In the above embodiment, the reception unit can receive the puking instruction from a communication terminal (7) of an occupant of the towing vehicle.

According to this embodiment, the occupant of the towing vehicle can exit from the towing vehicle and send the parking instruction to the trailer.

7. The trailer according to the above embodiment further comprises a start control unit (17, S18, S19) configured to, if a start instruction is received from a control unit of the towing vehicle during parking in the parking space, cause the trailer to start from the parking space and start following the towing vehicle.

According to this embodiment, since the trailer during parking can be started and made to follow in accordance with the instruction from the towing vehicle, the convenience for the occupant of the towing vehicle can be improved.

The invention is not limited to the foregoing embodiments, and various variations/changes are possible within the spirit of the invention.

What is claimed is:

1. An electric self-traveling trailer capable of performing automatic following traveling to a towing vehicle without mechanical connection, comprising:

a sensor configured to detect a peripheral situation;

a wireless receiver configured to receive a parking instruction; and a controller including at least one processor and at least one storage device, and configured to:
  recognize a parking space based on a detection result of the sensor;
  if the parking instruction has been received, set a moving track used to move the trailer from a position at which the towing vehicle and the trailer have stopped to the parking space; and
  move the trailer to the parking space along the set moving track,
  wherein the controller sets the moving track that maintains a distance between the towing vehicle and the trailer within a predetermined range, and
  when a moving distance to the parking space is not less than a predetermined distance, the controller sets the moving track including a section where the trailer and the towing vehicle move together.

2. The trailer according to claim 1, wherein if the moving track that maintains the distance between the towing vehicle and the trailer within the predetermined range cannot be set, the controller sets the moving track including a section where the trailer and the towing vehicle move together.

3. The trailer according to claim 2, further comprising a wireless transmitter configured to transmit, to a control circuit of the towing vehicle, a request to move together with the trailer if the controller has set the moving track including the section where the trailer and the towing vehicle move together.

4. The trailer according to claim 1, further comprising a wireless transmitter configured to transmit, to a control circuit of the towing vehicle, information representing that the trailer is moving to the parking space.

5. The trailer according to claim 1, wherein the wireless receiver can receive the parking instruction from a communication terminal of an occupant of the towing vehicle.

6. The trailer according to claim 1, wherein the controller is configured to, if a start instruction is received from a control circuit of the towing vehicle during parking in the parking space, cause the trailer to start from the parking space and start following the towing vehicle.

7. A control method of an electric self-traveling trailer capable of performing automatic following traveling to a towing vehicle without mechanical connection, the method being executed by a controller including at least one processor and at least one storage device, comprising:
  (i) detecting via a sensor a peripheral situation;
  (ii) recognizing a parking space based on a detection result of the sensor;
  (iii) if a parking instruction has been received, setting a moving track used to move the trailer from a position at which the towing vehicle and the trailer have stopped to the parking space; and
  (iv) moving the trailer to the parking space along the set moving track,
  wherein the step (iii) further comprises setting the moving track that maintains a distance between the towing vehicle and the trailer within a predetermined range, and
  when a moving distance to the parking space is not less than a predetermined distance, setting the moving track including a section where the trailer and the towing vehicle move together.

* * * * *